United States Patent [19]
Hankins

[11] Patent Number: 5,791,609
[45] Date of Patent: Aug. 11, 1998

[54] RANGE POLE DATA COLLECTOR HOLDER

[75] Inventor: Christopher Hankins, Santa Clara, Calif.

[73] Assignee: Trimble Navigation Limited, Sunnyvale, Calif.

[21] Appl. No.: 631,431

[22] Filed: Apr. 12, 1996

[51] Int. Cl.$^6$ .................................................. A47G 29/00
[52] U.S. Cl. ......................... 248/124.1; 248/125.1; 248/219.3; 248/276.1; 248/279.1; 248/316.6; 248/316.7
[58] Field of Search ................. 248/124.1, 125.1, 248/219.3, 278.1, 279.1, 295.11, 287.1, 316.7, 316.4, 276.1, 316.6

[56] References Cited

U.S. PATENT DOCUMENTS

| 338,526 | 3/1886 | Holdsworth et al. | 248/124.1 X |
|---|---|---|---|
| 2,208,860 | 7/1940 | Smart | 248/316.4 X |
| 2,585,592 | 2/1952 | Sears | 248/316.7 X |
| 2,696,963 | 12/1954 | Shepherd | 248/125.2 X |
| 3,178,144 | 4/1965 | Kimoto | 248/125.1 X |
| 4,211,380 | 7/1980 | Lillegard et al. | 248/316.7 X |
| 4,265,029 | 5/1981 | Jenkins | 248/124.1 X |
| 4,641,804 | 2/1987 | Martin et al. | |
| 5,033,709 | 7/1991 | Yuen | 248/316.4 X |
| 5,622,342 | 4/1997 | Mills | 248/278.1 X |

FOREIGN PATENT DOCUMENTS

| 344526 | 11/1904 | France | 248/124.1 |

Primary Examiner—Ramon O. Ramirez
Assistant Examiner—Derek J. Berger
Attorney, Agent, or Firm—Patrick T. King

[57] ABSTRACT

A bracket assembly provides dual-axis rotatable mounting of a GPS data collection unit to a range pole. A neck fits around a range pole and has a threaded flange at one end. A compression ring slips around the range pole and abuts the neck. A collar fits over the compression ring and threads onto the flange. A boom extends from the neck and supports a bracket assembly adapted to hold the data collector. The boom has a stop flange near the proximal end and external threading at the distal end. Two compression rings fit around the boom. A base member has a supporting sleeve which slips around the boom in between the compression rings. The sleeve supports a base plate. An internally threaded knob fits over the boom and the distally placed compression ring and mates with the external threading at the distal end of the boom. The knob compresses the sleeve in between the compression rings and secures the base member at a desired position to prevent it from rotating about the boom. A pair of resilient C-shaped wings extend upward from a base plate mounted to the outside of the sleeve and hold the data collector to the rotatably mounted sleeve. Each of the wings are ppositioned and adapted for snap-fit holding a waist of the data colector against the base plate.

15 Claims, 7 Drawing Sheets

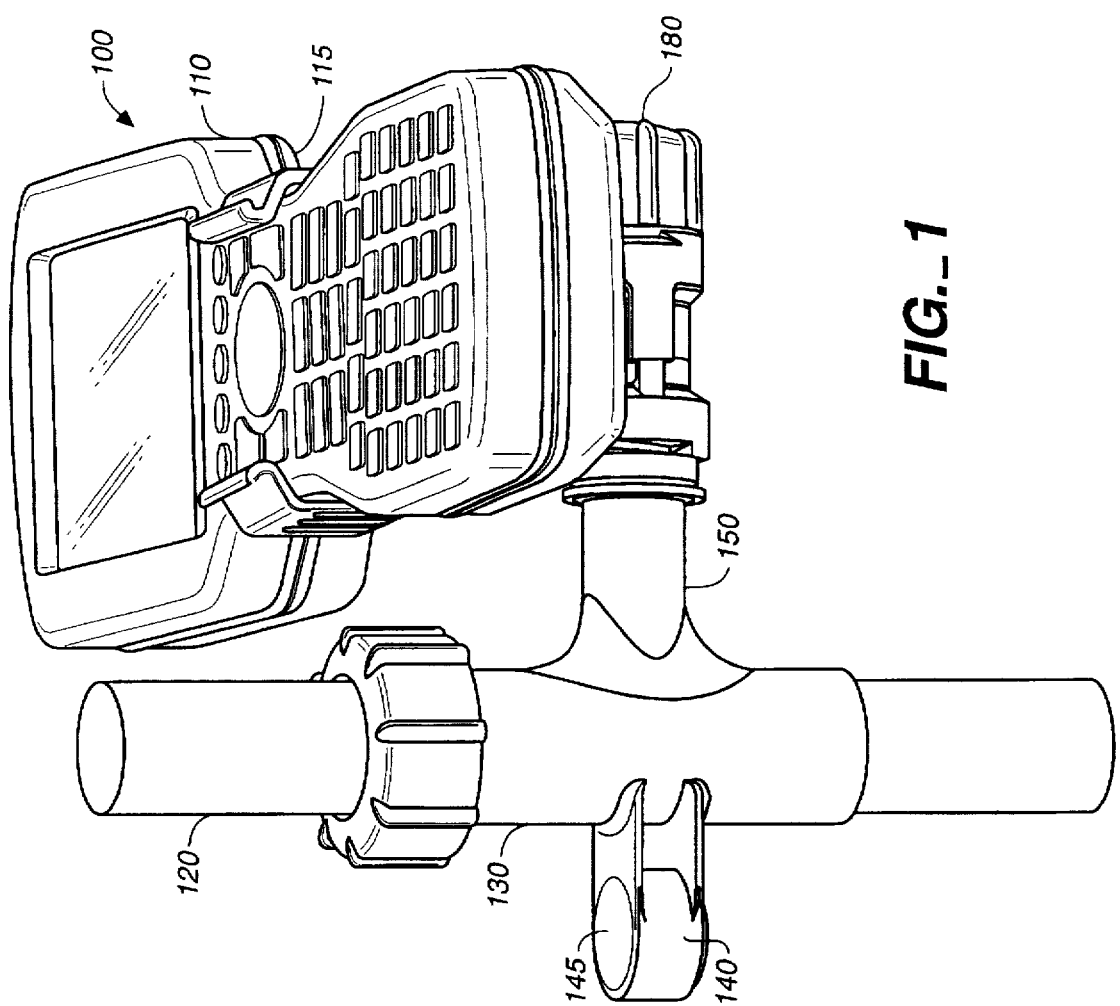
FIG._1

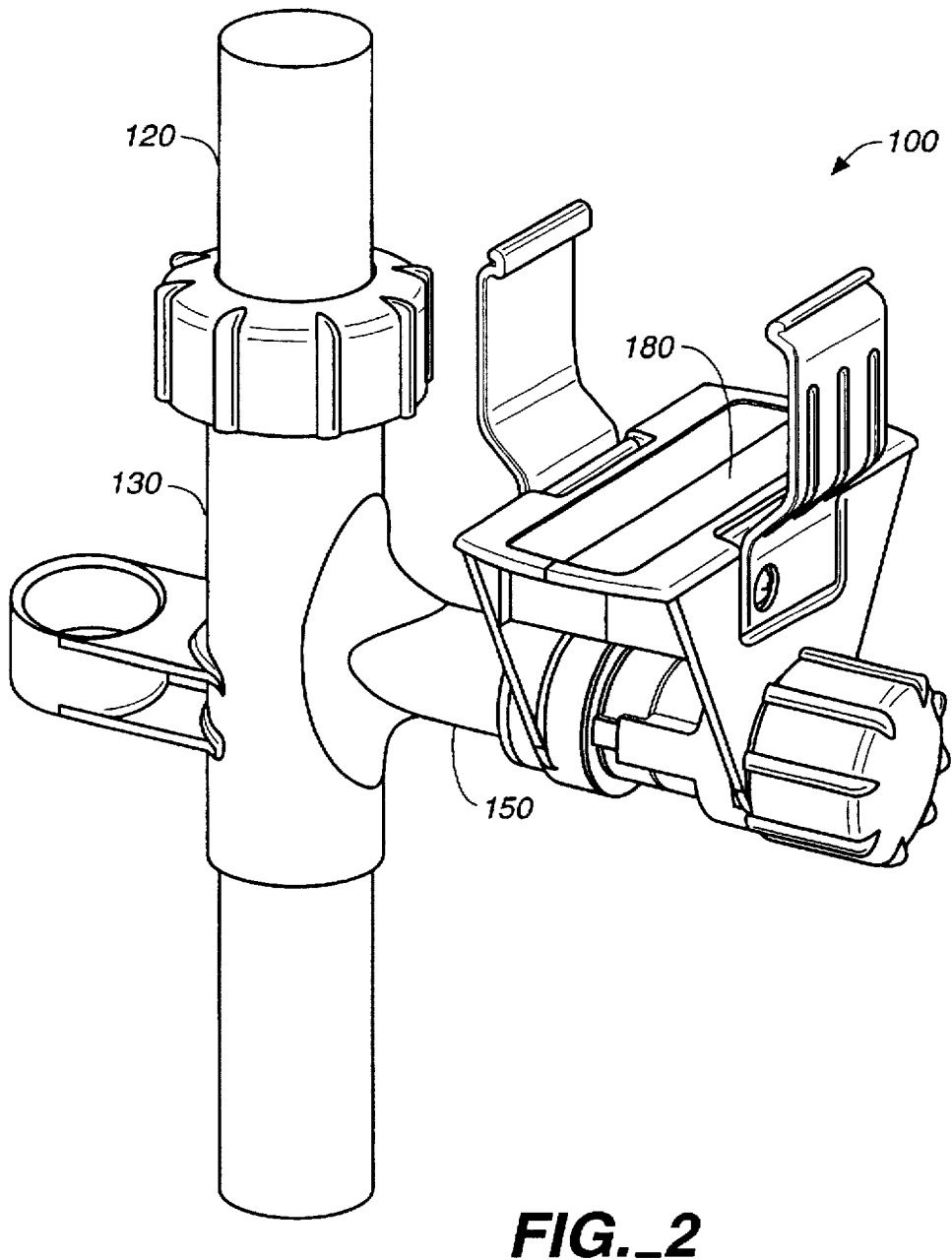
FIG._2

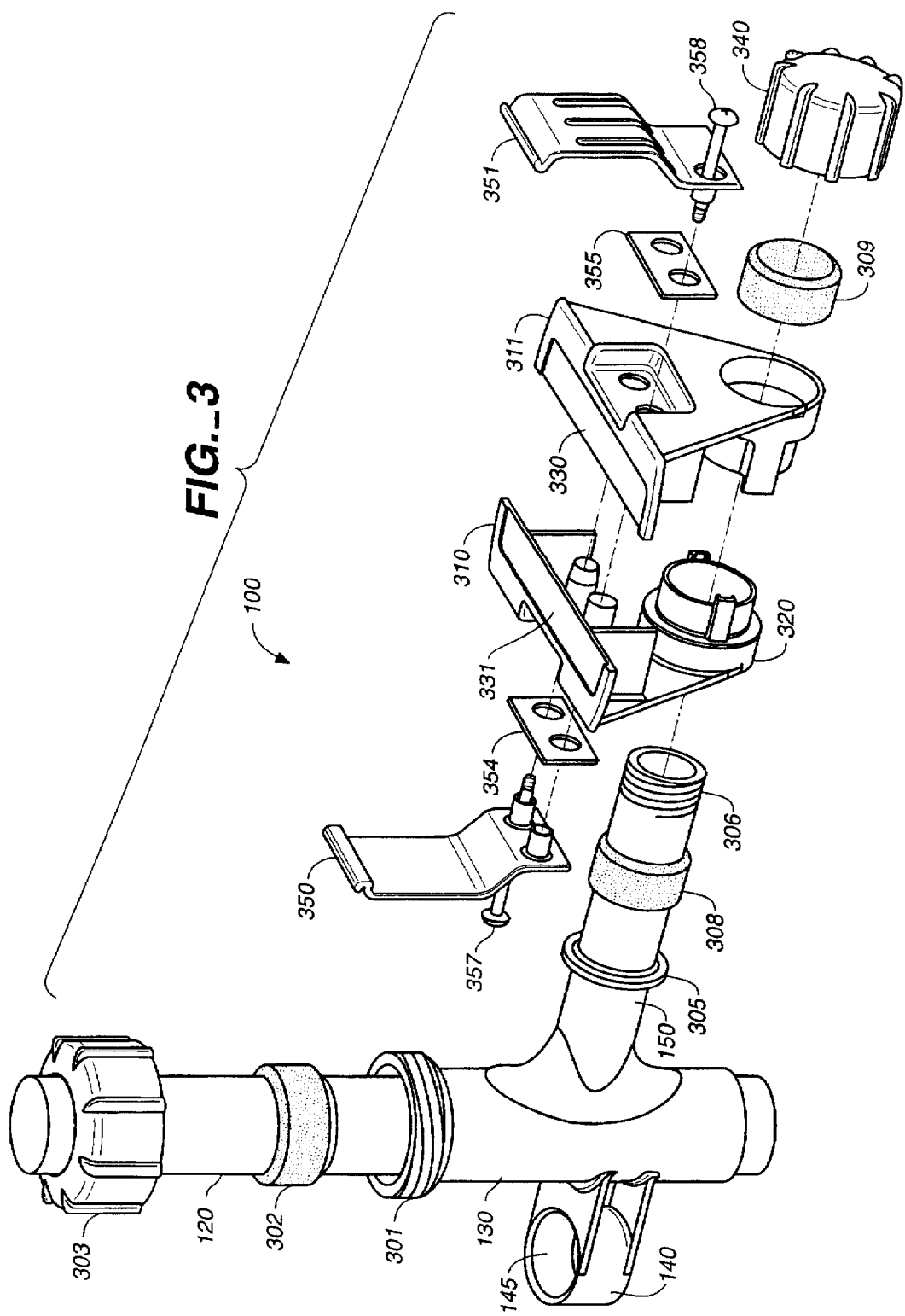
FIG._3

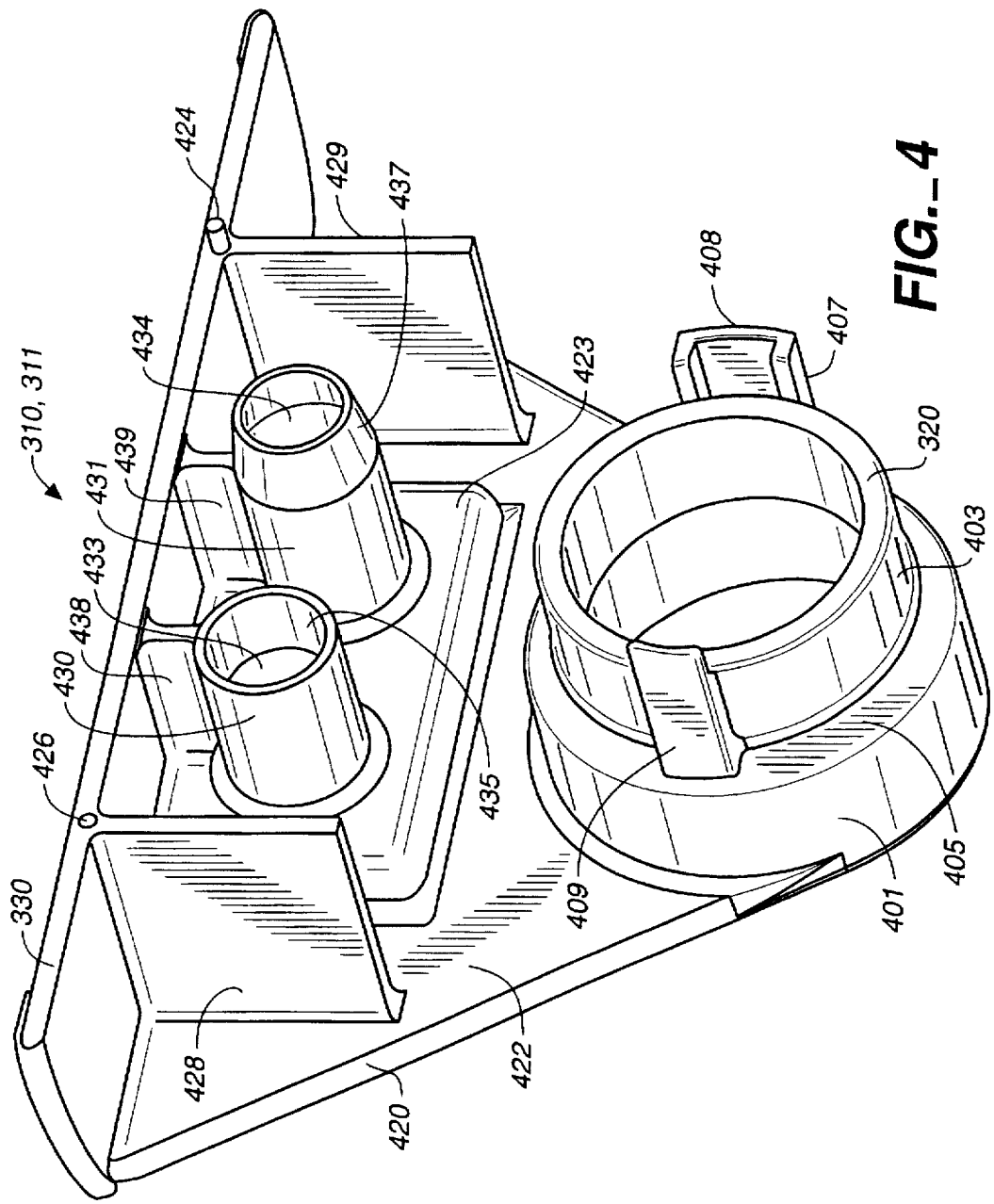
FIG._4

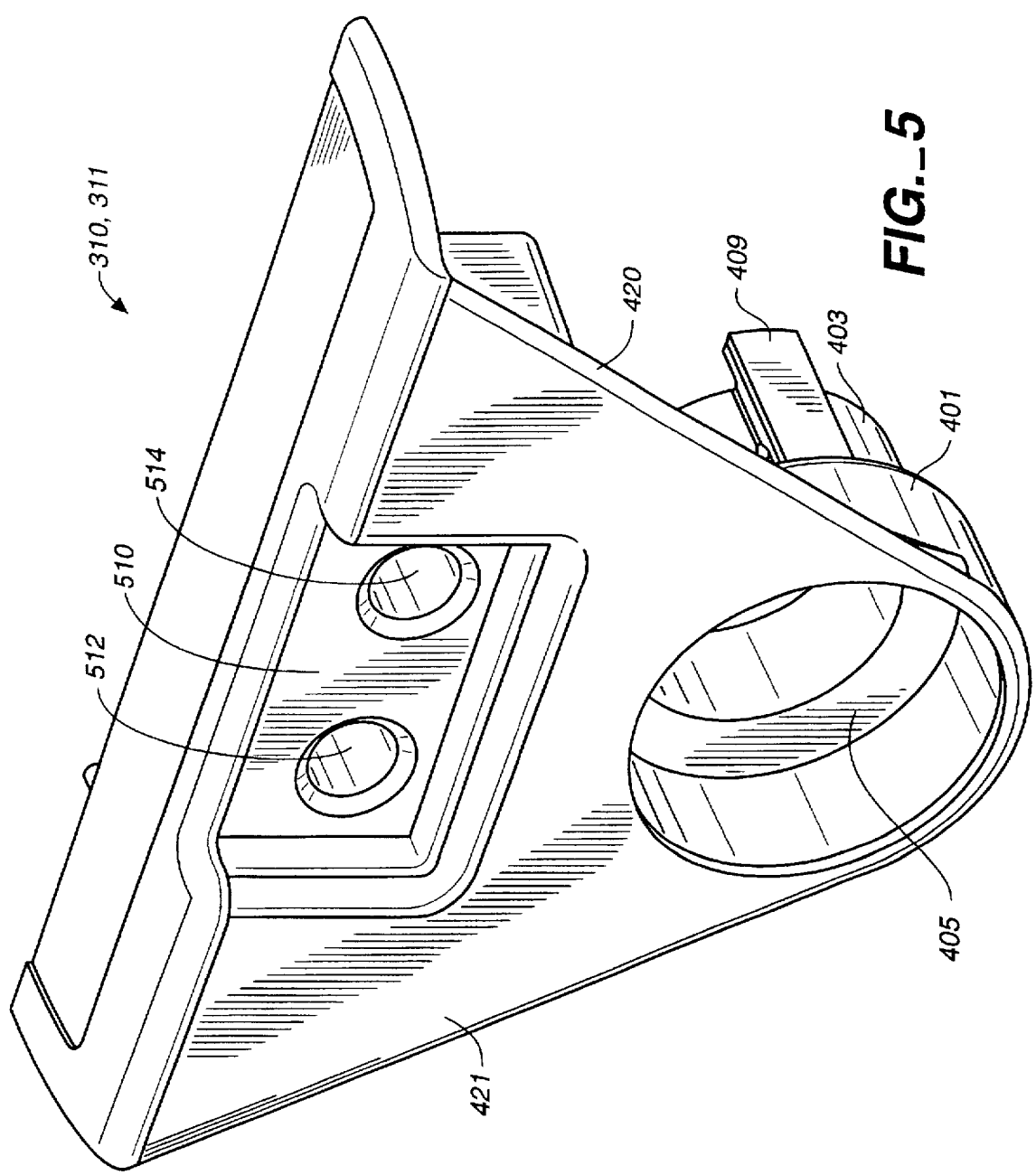

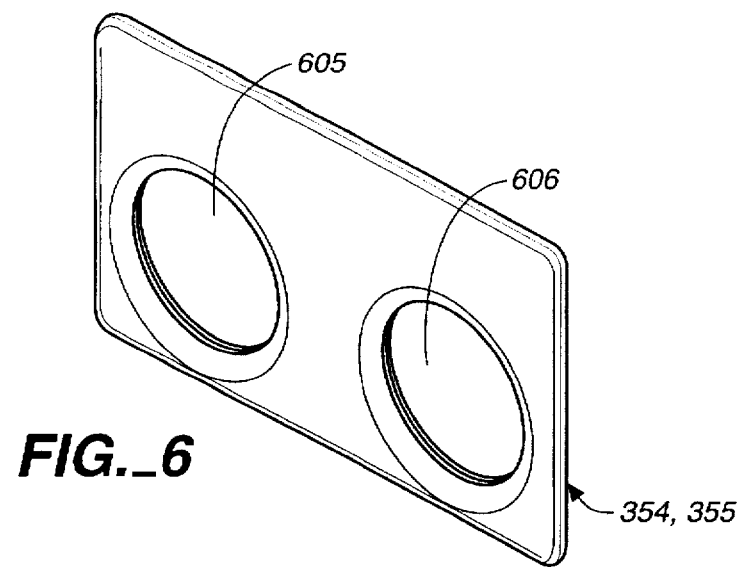
FIG._6
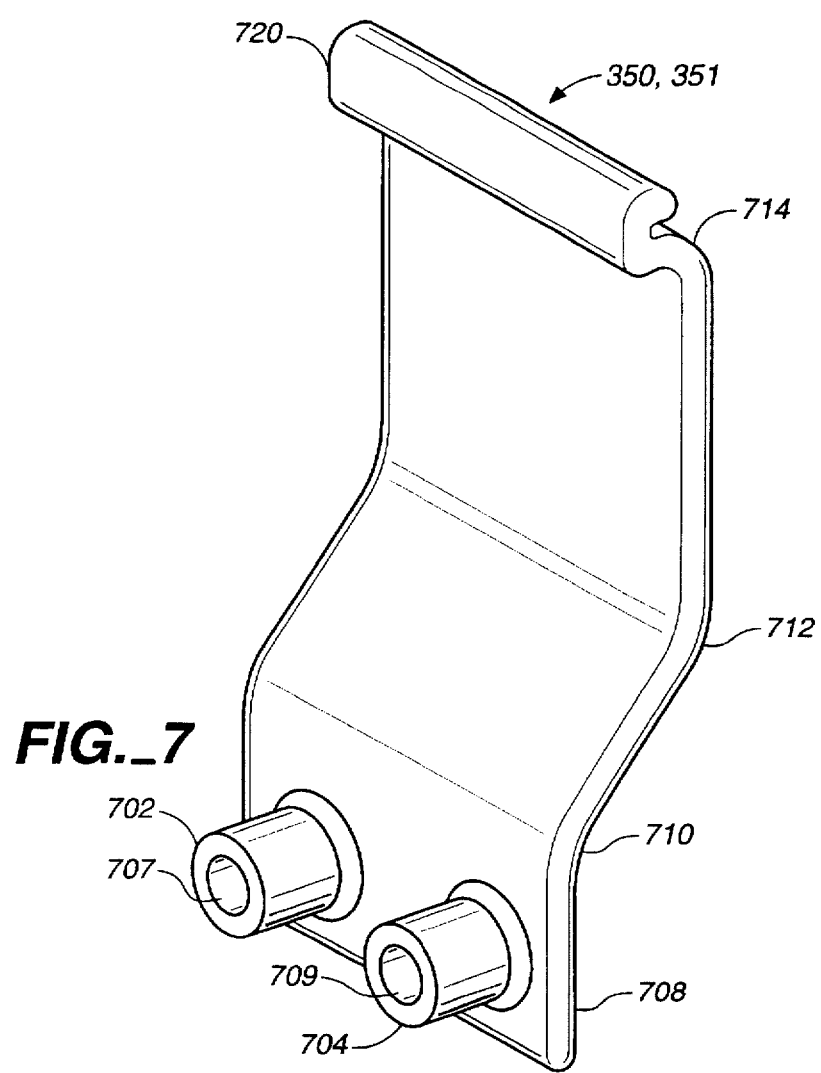
FIG._7

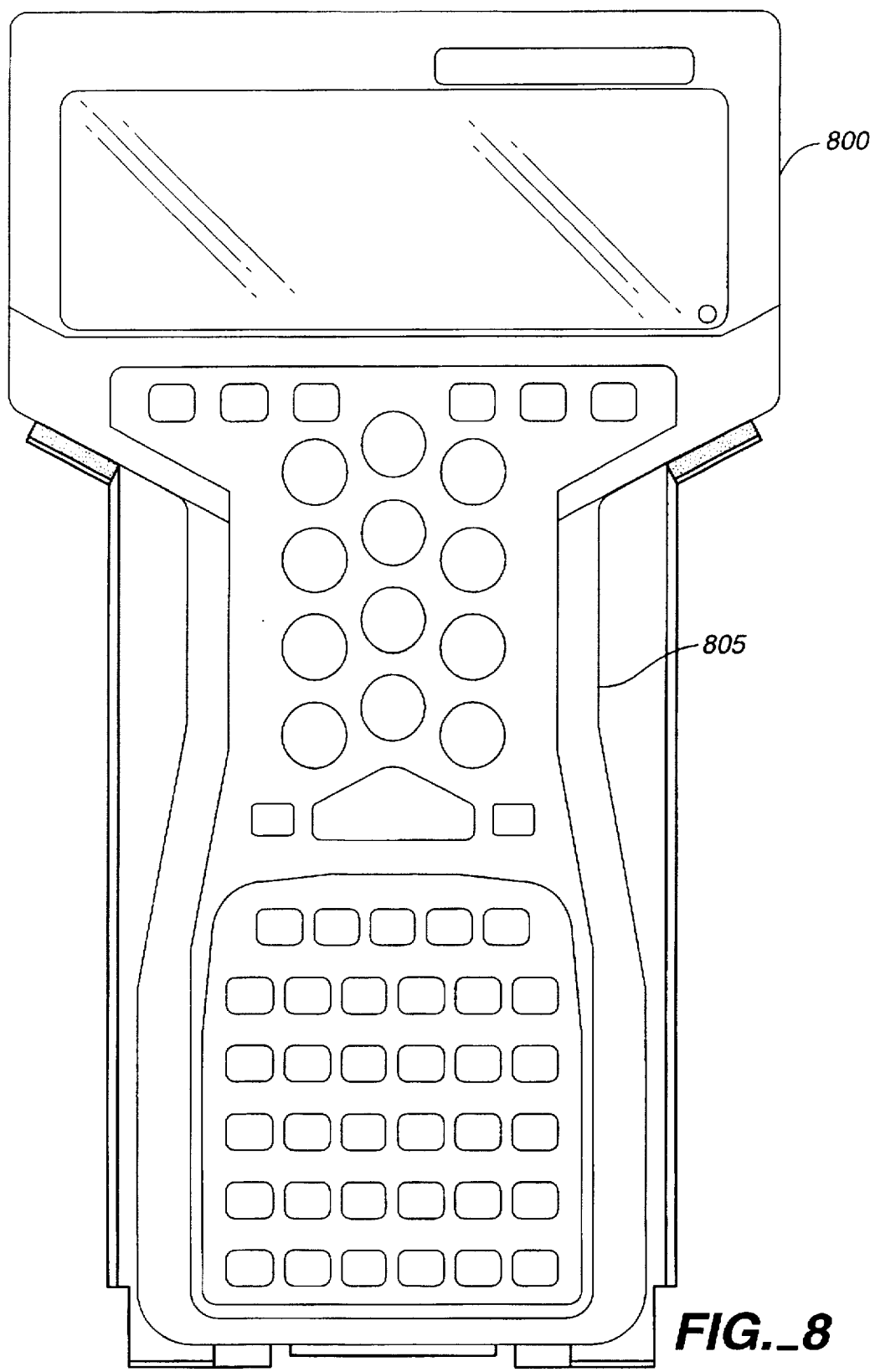
FIG._8

RANGE POLE DATA COLLECTOR HOLDER

BACKGROUND OF THE INVENTION

1. Field of the Invention

This invention is directed generally to surveying instruments and more particularly, to a bracket for mounting a GPS data collector unit to a range pole.

2. Prior Art

Modern surveying systems use global positioning systems, GPS, to determine the longitude, latitude, and altitude of points being surveyed. A GPS receiver is required at the surveying site during the time of operation. A GPS receiver includes an antenna and signal processing circuits mounted inside a GPS receiver housing. During surveying operations, the GPS receiver is mounted, or fixed, on the top end of a range pole. GPS-based surveying systems also require the use of computerized data collectors, which are electrically coupled with the GPS receiver to collect and store field data. Such data collectors are hand held by the operator or are secured to the range pole supporting the GPS receiver.

Prior art bracket assemblies for coupling data collection units to a range pole are known in the prior art. However, the prior art bracket assemblies do not provide convenient adjustment of the data collection unit with respect to the range pole.

SUMMARY OF THE INVENTION

During surveying operations, the GPS receiver fixed to the top of the range pole is rotated by a user so that an indicator on the receiver housing points, for example, to north. It is therefore desirable to have a coupling assembly for coupling the data collection unit to the range pole which allows for rotation of the data collection unit about the axis of the range pole so that a user may align the receiver to the north and rotate the data collection unit to a position convenient for the user.

It is also desirable to have a coupling assembly between the data collection unit and the range pole which allows for convenient adjustment of the position of the data collection unit along the range pole.

It is furthermore desirable to have means for rotating the plane of orientation of the data collection unit about an axis perpendicular to the axis of the range pole for a user to more easily observe the display of the data collection unit and to enter data with the integral keyboard of the data collection unit.

It is therefore an object of the instant invention to provide a more convenient method and apparatus for rotatably securing a GPS data collection unit to a range pole.

A method and apparatus is provided according to the invention for securing a GPS data collection unit to a range pole which allows for vertical position adjustment and for rotational position adjustment of the data collector unit about two separate axes.

A bracket assembly is provided which is adapted to couple to a range pole and hold a data collection unit in place. The assembly allows for support and rotation of a data collection unit about the axis of a range pole so that a user may align a GPS receiver, sitting on top of the range pole, to the north without rotating the data collection unit to an undesirable point. The assembly also allows for convenient vertical adjustment of the data collection unit up and down along the range pole. The instant invention also provides means for rotating the plane of orientation of the data collection unit about an axis perpendicular to the side wall of the data collection unit so as to allow a user to be able to more easily observe the display of the data collection unit.

The instant invention provides a range pole data collector support bracket assembly. The assembly includes a neck which fits around a range pole, having a threaded flange at the top end. A compression ring slips around the pole and abuts the neck. A collar fits over the compression ring and threads onto the flange. The neck may be adjusted vertically along the range pole by loosening the collar and secured by tightening the collar.

A boom extends from the neck and supports a bracket assembly adapted to hold the GPS data collection unit. By loosening the aforementioned collar, the boom may be rotated about the axis of the range pole to allow the data collector unit to be rotated to a desired position.

A bracket assembly for holding a GPS based data collector may be immovably attached to the boom. Alternatively, a bracket assembly may be rotatably mounted to the boom.

For rotatable mounting of a data collector to the boom, the boom has a stop flange near the proximal end and external threading at the distal end. First and second compression rings fit around the boom. A base member has a sleeve which slips around the boom in between the compression rings. The sleeve supports a base plate. An internally threaded knob fits over the boom and the distally placed compression ring and mates with the external threading at the distal end of the boom. The knob can be tightened to compress the sleeve in between the compression rings and against the stop flange so as to secure the base member and prevent it from swiveling about the axis of the boom. The knob can also be loosened to allow the base member to swivel about the axis of the boom to a desired position.

Means for holding the data collection unit to the rotatably mounted base member include a pair of resilient C-shaped wings which extend upward from a base plate mounted to the outside of the sleeve. Each of the wings are positioned and adapted for holding the waist of the GPS data collection unit, by snap fit, against the base plate.

BRIEF DESCRIPTION OF THE DRAWINGS

The accompanying drawings, which are incorporated in and form part of this specification, illustrate embodiments of the invention and, together with the description, serve to explain the principles of the invention:

FIG. 1 is a perspective view of a GPS data collection unit snap fit into a bracket assembly of the instant invention.

FIG. 2 is a perspective view of a bracket assembly of the instant invention.

FIG. 3 is an exploded perspective view of a bracket assembly for dual axis rotatable mounting of a GPS data collection unit to a range pole, according to the invention.

FIG. 4 is a perspective view of the rear side of a base member.

FIG. 5 is a perspective view of the front side of a base member.

FIG. 6 is a perspective view of a spacer.

FIG. 7 is a perspective view of a resilient wing.

FIG. 8 is a perspective view of an alternative GPS data collection unit.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 shows a perspective view of a range pole data collector support bracket assembly 100, according to the instant invention, with a GPS data collection unit 110 mounted therein. The GPS data collection unit 110 has a waist region 115. The bracket assembly is mounted to a range pole 120 having a longitudinal axis. A hollow cylindrical neck 130 attaches around the circumference of the range pole 120.

A level support assembly 140 extends perpendicularly outward from the neck 130. The level support assembly 140 is adapted to hold a level device 145, such as a bubble level with a circular target, in a plane perpendicular to the range pole 120. The level support assembly 140 allows a user to orient the range pole 120 perpendicular to the earth by moving the range pole 120 until the level device 145 indicates that the level device 145 is level.

A boom 150 extends perpendicularly outward from the neck 130 and oppositely from the level support assembly 140. The boom 150 has a bracket 180 attached near the distal end of the boom 150. The bracket 180 holds the data collection unit 110.

FIG. 2 shows a perspective view of a range pole data collector support bracket assembly 100, according to the instant invention, without the GPS data collection unit 110.

FIG. 3 shows an exploded perspective view of the range pole data collector support bracket assembly 100 shown in FIG. 1. The neck 130 has an externally threaded flange 301 at the top end. A pole compression ring 302 with chamfered ends slips around the range pole 120 and mates with an angled inner surface of the flange 301. A collar 303, for compressing the pole compression ring 302, is internally threaded for mating with the external threads of the flange 301. The interior surface of the collar 303 is angled to match the angle of the chamfered end of the pole compression ring 302. The collar 303 slips around the range pole 120 and is threaded onto the flange 301 to compress the compression ring 302 between the collar 303 and the flange 301. The neck 130, compression ring 302, and collar 303 are loosened to allow for adjustable rotation of the data collection unit 110 about the axis of the range pole 120 so that a user may align a GPS receiver (as shown in FIG. 1), which is fixed at the top end of the range pole 120, to the north direction while rotating the data collection unit 110 to a convenient position. This arrangement of neck 130, compression ring 302, and collar 303 also allows for convenient vertical adjustment of the data collection unit 110 along the longitudinal axis of the range pole 120.

The instant invention also provides for rotating the data collection unit 110 about a boom axis perpendicular to the range pole 120 to allow a user to easily observe the display of the unit 110. This is provided with a boom 150 which extends perpendicularly from the coaxial neck 130 and range pole 120. The boom is cylindrical and has a stop flange 305 near its proximal end and external threads 306 at its distal end. A first boom compression ring 308 and a second boom compression ring 309, which are shaped similarly to the pole compression ring 302, fit around the boom 150. A pole compression ring 302 with chamfered ends slips around the range pole 120 and mates with an angled inner surface of the flange 301. The boom compression rings 308, 309 have chamfered ends.

The base assembly 180, for mounting the data collection unit 110, is provided by a first base member 310 and a second base member 311 which mate with each other. The base members 310, 3111 are identical to each other to provide for eases in manufacturing. Each of the mating base members 310, 311 are injection molded from a Delrin material. Alternatively, each of the base members 310, 311 may be injection molded with other types of plastic polymer or metal material, or they may be machined from plastic polymer or metal material. The base assembly 180 may also be constructed as a single piece. Each base member has a sleeve 320 which fits around the boom 150 and a base plate 330 supported by the sleeve 320. The inner diameter of the sleeve 320 is slightly larger than the outer diameter of the boom 150.

The two base members 310, 311 are adapted to mate to each other, inside end to inside end, so that the base plate 330 of the first base member is continuous with and parallel to the base plate 331 of the second base member.

The first and second base members 310, 311 are positioned on the boom 150, between the first and second boom compression rings 308, 309. An internally threaded compression knob 340 mates with the external threads 306 at the distal end of the boom 150. The stop flange 305 and the external threading are spaced apart so that the first and second mating base members 310, 311, positioned in between the first and second boom compression rings 308, 309, are pressed against each other when the internally threaded knob 340 is threaded onto the external threads 306 of the boom 150.

First and second resilient C-shaped wings 350, 351, which rise up from the base plate 330, are spaced apart so that the GPS data collection unit 110 (as shown if FIG. 1) snap fits between the resilient wings 350, 351. First and second spacers 354, 355 fit respectively between the first and second resilient wings 350, 351 and the first and second base members 310, 311. The first and second spacers 354, 355 may be inserted or removed to vary the width of the base assembly 180 so that various data collection units 110 with waist regions 115 of varying width may snap fit tightly between the wings 350, 351.

First and second screws 357, 358 pass through holes in the bottom of the resilient wings 350, 351, through holes in the spacers 354, 355, and through holes in the base members 310, 311 to hold the resilient wings 350, 351 to the base members 310, 311.

FIG. 4 and FIG. 5 respectively show a perspective view of the rear side and of the front side of one of the identical base members 310. The base members 310 has a cylindrical sleeve 320 which slides over the boom 150. One end 401 of the sleeve 320 has an inner diameter which is larger than the diameter of the boom 150 to accept the boom compression rings 308, 309. The other end 403 of the sleeve 320 has a diameter which is slightly larger than the diameter of the boom 150. The two ends 401, 403 of the sleeve 320 are separated by a sloped transition region 405. The boom compression rings 308, 309 have chamfered ends which slips around the boom 150 and mate with respective sloped transition regions or the base members 310, 311.

A protruding member 407 having an inner slot 408 formed therein extends from the end 403 of the sleeve 320 in a direction parallel to the axis of the sleeve 320. A corresponding tab 409 extends from the end 403 of the sleeve also in a direction parallel to the axis of the sleeve 320. The tab 409 is designed to slide into engagement with a corresponding slot 408 on a mating base member.

A supporting sidewall 420 extends radially from the larger-diameter end 401 of the sleeve 320. The sidewall 420 has an outer side 421 and an opposite inner side 422 wherein the sleeve 320 extends outwardly from the inner side 422 of the sidewall 420. The sidewall 420 has an inwardly projecting portion 423 which forms a recessed space near the top of the outer side 421 of the sidewall 420.

The base plate 330 of each base member 310, 311 extends perpendicularly outward from the inner side 422 of the sidewall 420 at the top edge of the sidewall 420. The base plate 330 has a plug 424 extending from its distal edge in a direction parallel to the base plate 330. The plug 424 slides into a corresponding cavity 426 in the distal edge of a mating base plate.

First and second support ribs 428, 429 extend perpendicularly from the inner side 422 of the sidewall 420 and downwardly from the underside of the base plate 330.

First and second bosses 430, 431 extend perpendicularly outward the inwardly projecting portion 423 which forms the recessed space near the top of the outer side 421 of the sidewall 420. The first and second bosses 430, 431 have respective through holes 433, 434 formed therethrough. The diameter of the the through hole formed in the first boss 430 decreases inwardly from its distal end. The external diameter of the second boss 4231 increases inwardly from its distal end. This permits the the distal end of the first boss 430 to engage and slide into the distal end of the second boss 431. First and second support ribs 438, 439, are provided for supportively connecting the bosses 430, 431 to the bottom surface of the base plate 330.

FIG. 5 shows a recessed portion 510 into the supporting sidewall 420. The first and second spacers 354, 355 fit into the recessed portion 510 of the sidewall 420 to accomodate GPS data collection units with different waist dimemsions. Through holes 512, 514 in the recessed portion 510 of the sidewall 420 pass through the supporting sidewall 420 into the central bored areas of the first and second bosses 430, 431.

FIG. 6 shows a perspective view of one of the identical spacers 354. Each of the spacers 354, 355 have first and second through holes 605, 606 which line up with the first and second through holes 512, 514 in the recessed portion 510 of the sidewall 420.

FIG. 7 shows a perspective view of one of the identical resilient C-shaped wings 350, 351. First and second wing bosses 702, 704 extend perpendicularly outward from a lower portion 708 of one side of the resilient wing 350. The first wing boss 702 includes a bore 707 formed therein and the second wing boss has a bore formed there through with internal threads 709. The first and second wing bosses 702, 704 fit through the holes 605, 606 and the boss through holes 433, 434 of the base members 310, 311 to provide stability for the resilient wings 350, 351.

A outward bend 710 in the resilient wing 350 begins above the wing bosses 702, 704. An upward bend 712 begins above the bend 710. An inward bend 714 bends the wing inwardly. A inward lip 720 is formed at the top end of the wing. The angles and dimensions of the bend adapt the witngs to resilently fit the contours of the data collection unit 110 at the waist region 115 of the data collection unit 110 (as illustrated in FIG. 1).

FIG. 8 shows an alternative GPS data collection unit 800 which has a larger waist region 805 than the waist region 115 of the GPS data collection unit 110 shown in FIG. 1. The bracket assembly 180 of the instant invention may be adjusted to hold various data collector units with waist regions of varying width. To accomodate data collector units of varying waist width, the distance, between the resilient C-shaped wings 350, 351, is varied by inserting or removing the spacers 354, 355.

We claim:

1. A bracket assembly for dual-axis rotatable mounting of a GPS data collection unit to a range pole, comprising:
   a boom;
   a first rotatable mounting assembly for rotatably mounting said boom to a range pole;
   a supporting assembly having a pair of opposing C-shaped resilient wings adapted to snap-fit hold a GPS data collection unit; and
   a second rotatable mounting assembly for rotatably mounting said supporting assembly to said boom, wherein the second rotatable mounting assembly for rotatably mounting said bracket assembly to said boom includes:
      the boom having a stop flange which is located at a proximal end of said boom and the boom having external threads formed on a distal end thereof;
      first and second compression rings adapted to fit around said boom at the respective distal and proximal ends thereof;
      a sleeve which slips over said boom between said first and second compression rings with said first compression ring abutting said stop flange; and
      an internally threaded knob which fits over said boom and over said second compression ring and mates with said external threads at the distal end of said boom.

2. The bracket assembly of claim 1 wherein the first rotatable mounting assembly for rotatably mounting the boom to a range pole includes:
   a neck, which is adapted to fit around said range pole and which has a threaded flange at one end, wherein said boom extends from said neck;
   a third compression ring which slips around said range pole; and
   a collar which fits over said compression ring and threads onto said threaded flange to hold said neck at a vertical position on said range pole.

3. The bracket assembly of claim 1 wherein the pair of opposing C-shaped resilient wings extend upwardly from a base plate wherein the wings are positioned and adapted for snap-fit holding a waist area of the GPS data collection unit against the base plate.

4. A bracket assembly for dual-axis rotatable mounting of a GPS data collection unit to a range pole, comprising:
   a neck which is adapted to fit around a range pole and which has a threaded flange at one end;
   a pole compression ring which is adapted to slip around said range pole;
   a collar which fits over said pole compression ring and threads onto said threaded flange to hold said neck at a vertical position on said range pole;
   a cylindrical boom extending from said neck and having a stop flange near a proximal end thereof and external threads at a distal end thereof;
   a boom compression ring adapted to fit around said boom at the distal end thereof;
   a base member having a sleeve which slips over and is fixed in position on said boom, said base member having a base plate attached to said sleeve;

first and second opposing resilient C-shaped wings which extend upwardly from said base plate for snap-fit holding a waist area of a GPS data collection unit against the base plate; and an internally threaded knob adapted to fit over said boom compression ring and mate with said external threads at the distal end of said boom to engage said sleeve and hold said base member in position on said boom.

5. The bracket assembly of claim 4, further comprising:
a level support assembly attached to said neck and adapted to hold a level device in a plane perpendicular to said range pole.

6. A bracket assembly for dual axis rotatable mounting of a GPS data collection unit to a range pole, comprising:
a neck which is adapted to fit around a range pole and which has a threaded flange at one end;
a pole compression ring which is adapted to slip around said range pole and abuts said threaded flange; and
a collar which fits over said pole compression ring and threads onto said threaded flange to hold said neck at a vertical position on said range pole;
a boom extending from said neck;
the boom having a stop flange located near a proximal end of said boom and having external threads at a distal end thereof;
a first boom compression ring located on said boom adapted to abut said stop flange and a second boom compression ring located near the distal end of said boom;
a rotatable mounting assembly for rotatably mounting a GPS data collection unit to said boom, said rotatable mounting assembly including:
a base assembly having a sleeve with an inner diameter adapted to slip over said boom and having a base plate attached to said sleeve;
first and second opposing resilient C-shaped wings which extend upwardly from said base plate wherein the wings are positioned and adapted for snap-fit holding a waist area of the GPS data collection unit, against the base plate; and
an internally threaded knob adapted to fit over said boom compression ring and mate with said external threads at the distal end of said boom to hold said base assembly in position on said boom.

7. The bracket assembly of claim 6, further comprising:
a level support assembly attached to said neck and adapted to hold a level device in a plane perpendicular to said range pole.

8. A bracket assembly for dual axis rotatable mounting of a GPS data collection unit to a range pole, comprising:
a neck, which is adapted to fit around a range pole, and which has a threaded flange at one end;
a pole compression ring which is adapted to slip around said range pole;
a collar which fits over said pole compression ring and threads onto said threaded flange to hold said neck at a vertical position on said range pole;
a cylindrical boom extending from said neck and having a stop flange near a proximal end and external threads at a distal end thereof;
a first boom compression ring which fits around said boom adjacent to the stop flange and a second boom compression ring located on the distal end of said boom;

a base assembly including:
first and second mating base members wherein each base member includes:
a sleeve portion adapted to slip over said boom and having a first end with an outer diameter greater than the outer diameter of a second end of said sleeve portion, wherein the first end of said sleeve portion engages a corresponding one of said compression rings,
a supporting sidewall extending radially from the first end of said sleeve portion, said sidewall having an outer side and an inner side, and
a base plate portion extending perpendicularly outward from the inner side of said sidewall,
first and second bosses extending perpendicularly from the inner side of said sidewall and having boss through holes formed therein;
wherein said first and second mating base members are positioned around said boom, between said first and second boom compression rings, so that an inner end of said first base member and an inner end of said second base member face each other;
first and second opposing resilient wings for snap-fit holding a data collection unit, said wings extending upwardly from the base plates of said first and second mating base members wherein each resilient wing includes first and second wing bosses extending perpendicularly outward from a lower portion of one side of each of said resilient wings, wherein the first wing boss is bored through and internally threaded and the second wing boss is bored straight through;
an outward bend in each of said resilient wings beginning above each of said wing bosses and bending away from each of said wing bosses;
a first inward bend in each of said resilient wings beginning above each of said outward bends;
a second inward bend in each of said resilient wings beginning above each of said first inward bends;
wherein each of said resilient wings include an inwardly extending lip at a top end of each of said resilient wings;
wherein said opposing resilient wings and the base plates allow said resilient wings to snap fit around a waist of said data collection unit and hold said data collection unit against said base plates;
a first screw and a second screw, wherein said second screw is adapted to slide through said second wing boss of said second wing, through said sidewall base bosses, and to thread into said first wing boss of said first wing, and wherein said first screw is adapted to slide through said second wing boss of said first wing, through said sidewall bosses, and to thread into said first wing boss of said second wing; and
an internally threaded knob adapted to fit over said second boom compression rings and mate with said external threads at the distal end of said boom to hold the base assembly in position on the boom.

9. The bracket assembly of claim 8, further comprising:
a protruding structure having a slot formed therein and extending from each said sleeve portion;
a tab extending from each said sleeve portion, said tab being positioned to slide into the corresponding slot of the other sleeve portion.

10. The bracket assembly of claim 8, further comprising:
a recessed portion, in the outer side of each supporting sidewall; and first and second spacers each adapted to fit into the recessed portion in the outer side of a corresponding one of said supporting sidewalls, said spacers having first and second spacer through holes which line up with the boss through holes in said first and second sidewall bosses.

11. The bracket assembly of claim 8, further comprising:

a cavity in an inner edge of each base plate; and a plug extending from the inner edge of said base plate in a direction parallel to said base plate, said plug being placed and adapted to slide into the corresponding cavity in the other base plate.

12. The bracket assembly of claim 8 further comprising first and second base support ribs extending perpendicularly outward from the second side of corresponding ones of said sidewalls and abutting a bottom of said each base plate.

13. The bracket assembly of claim 8 further comprising first and second boss support ribs extending respectively from outer diameters of each of their respective first and second bosses up to the base plates.

14. The bracket assembly of claim 8 wherein the internal diameter of the through hole through each first sidewall boss decreases in diameter from its distal end and the external diameter of the second boss increases in diameter from its distal end such that the distal end of the first sidewall boss of one said sidewall slides over the distal end of the second sidewall boss of the other sidewall.

15. The bracket assembly of claim 8, further comprising:

a level support assembly attached to said neck and adapted to hold a level device in a plane perpendicular to said range pole.

* * * * *